(12) United States Patent
Venu et al.

(10) Patent No.: US 10,185,635 B2
(45) Date of Patent: Jan. 22, 2019

(54) TARGETED RECOVERY PROCESS

(71) Applicant: ARM Limited, Cambridge (GB)

(72) Inventors: Balaji Venu, Cambridge (GB); Xabier Iturbe, Cambridge (GB); Emre Özer, Buckden (GB)

(73) Assignee: ARM Limited, Cambridge (GB)

( * ) Notice: Subject to any disclaimer, the term of this patent is extended or adjusted under 35 U.S.C. 154(b) by 122 days.

(21) Appl. No.: 15/463,066

(22) Filed: Mar. 20, 2017

(65) Prior Publication Data
US 2018/0267866 A1    Sep. 20, 2018

(51) Int. Cl.
*G06F 11/00* (2006.01)
*G06F 11/16* (2006.01)
*G06F 11/18* (2006.01)

(52) U.S. Cl.
CPC ...... *G06F 11/1641* (2013.01); *G06F 11/1629* (2013.01); *G06F 11/184* (2013.01)

(58) Field of Classification Search
CPC . G06F 11/1629; G06F 11/1641; G06F 11/184
See application file for complete search history.

(56) References Cited

U.S. PATENT DOCUMENTS

| | | | | |
|---|---|---|---|---|
| 5,423,024 | A | * | 6/1995 | Cheung .............. G06F 11/181 714/11 |
| 2005/0154573 | A1 | * | 7/2005 | Maly .................. G06F 11/261 703/21 |

(Continued)

OTHER PUBLICATIONS

Iturbe et al., "A Triple Core Lock-Step (TCLS) ARM® Cortex®-R5 Processor for Safety-Critical and Ultra-Reliable Applications", 2016 46th Annual IEEE/IFIP International Conference on Dependable Systems and Networks Workshop (DSN-W), Jun. 28-Jul. 1, 2016, 4 pages.

*Primary Examiner* — Joshua P Lottich
(74) *Attorney, Agent, or Firm* — Nixon & Vanderhye P.C.

(57) ABSTRACT

An apparatus comprises at least three processing circuits to perform redundant processing of common program instructions. Error detection circuitry coupled to a plurality of signal nodes of each of said at least three processing circuits comprises comparison circuitry to detect a mismatch between signals on corresponding signal nodes in said at least three processing circuits, the plurality of signal nodes forming a first group of signal nodes and a second group of signal nodes. In response to the mismatch being detected in relation to corresponding signal nodes within the first group, the error detection circuitry is configured to generate a first trigger for a full recovery process for resolving an error detected for an erroneous processing circuit using state information derived from at least two other processing circuits. In response to the mismatch being detected in relation to corresponding signal nodes within the second group the error detection circuitry is configured to generate a second trigger for a targeted recovery process for a subset of components of the erroneous processing circuit. By implementing a targeted recovery process for a subset of components of an erroneous processing circuit a cheaper recovery process may be provided.

20 Claims, 8 Drawing Sheets

(56) References Cited

U.S. PATENT DOCUMENTS

| | | | |
|---|---|---|---|
| 2006/0150186 A1* | 7/2006 | Grayver | G06F 11/1494 |
| | | | 718/102 |
| 2007/0220367 A1* | 9/2007 | Smith | G06F 11/181 |
| | | | 714/48 |
| 2007/0260939 A1* | 11/2007 | Kammann | G06F 11/0739 |
| | | | 714/48 |
| 2010/0169886 A1* | 7/2010 | Troxel | G06F 11/184 |
| | | | 718/101 |

* cited by examiner

TARGETED RECOVERY PROCESS

The present technique relates to the field of data processing.

A data processing apparatus may be provided with at least three processing circuits to perform redundant processing of common program instructions. By performing the same processing operations on each of the redundant processors, outputs of the respective processing circuits can be compared to detect any mismatch which may indicate that an error has occurred in one of the processing circuits. If an error occurs in one of the processing circuits, the outputs of the other two or more processing circuits can be used to recover from the error. This approach can be particularly useful for applications which are safety-critical or for which a failure would cause huge losses (e.g. space missions).

At least some examples provide an apparatus comprising:

at least three processing circuits to perform redundant processing of common program instructions; and error detection circuitry coupled to a plurality of signal nodes of each of said at least three processing circuits, said error detection circuitry comprising comparison circuitry to detect a mismatch between signals on corresponding signal nodes in said at least three processing circuits;

said plurality of signal nodes forming a first group of signal nodes and a second group of signal nodes; wherein in response to said mismatch being detected in relation to corresponding signal nodes within said first group said error detection circuitry is configured to generate a first trigger for a full recovery process for resolving an error detected for an erroneous processing circuit using state information derived from at least two other processing circuits, and in response to said mismatch being detected in relation to corresponding signal nodes within said second group to generate a second trigger for a targeted recovery process for a subset of components of said erroneous processing circuit.

At least some examples provide an apparatus comprising:

at least three means for processing for performing redundant processing of common program instructions; and means for detecting errors coupled to a plurality of signal nodes of each of said at least three processing means, said means for detecting errors comprising comparing means for detecting a mismatch between signals on corresponding signal nodes in said at least three means for processing;

said plurality of signal nodes forming a first group of signal nodes and a second group of signal nodes; wherein in response to said mismatch being detected in relation to corresponding signal nodes within said first group said means for detecting errors is configured to generate a first trigger for a full recovery process for resolving an error detected for an erroneous means for processing using state information derived from at least two other means for processing, and in response to said mismatch being detected in relation to corresponding signal nodes within said second group to generate a second trigger for a targeted recovery process for a subset of components of said erroneous means for processing.

At least some examples provide a method comprising:

performing redundant processing of common program instructions using at least three processing circuits;

detecting a mismatch between signals on corresponding signal nodes in said at least three processing circuits;

said signal nodes forming a first group of signal nodes and a second group of signal nodes; and in response to detecting said mismatch in relation to corresponding signal nodes within said first group, generating a first trigger for a full recovery process for resolving an error detected for an erroneous processing circuit using state information derived from at least two other processing circuits, and in response to said mismatch being detected in relation to corresponding signal nodes within said second group, generating a second trigger for a targeted recovery process for a subset of components of said erroneous processing circuit.

Further aspects, features and advantages of the present technique will be apparent from the following description of examples, which is to be read in conjunction with the accompanying drawings, in which.

Examples of the present technique are discussed below. It will be appreciated that the invention is not limited to these particular examples.

Processing circuits may occasionally encounter an error, for example caused by a single event upset. A single event upset is a phenomenon that occurs in storage elements such as static random access memory (SRAM) and flip-flops, which causes a single bit of a stored value to change state. A single event upset may be caused by a particle, such as a cosmic ray from outer space or a particle or ion produced when a cosmic ray hits an atom in the Earth's atmosphere, striking a bitcell or flip-flop. This is particularly a problem for electronics used for space applications where the device is intended to be used outside the Earth's atmosphere, but also for some terrestrial electronics. A classical solution to make a processor radiation-tolerant is to use rad-hard semiconductor process technology to manufacture the transistors and other devices forming the processor. However, this technology also increases the chip manufacturing costs, reduces the performance and leads to overheads in area and energy. Another approach is to provide redundant components within a single processor, e.g. multiple versions of the same register, or using error detection and correction schemes to protect data processed by the processor. However, this typically requires modification of an original processor design designed without such redundant features, thus the modified design is no longer as well optimized for performance/energy efficiency as the original processor design, and the additional verification and certification of the modified processor would lead to increased design costs.

Instead, redundancy can be provided at the system level, in which a data processing apparatus may be provided with at least three processing circuits to perform redundant processing of common instructions, and error detection circuitry is provided to compare signals on corresponding signal nodes output from each of the respective processing circuits. When the error detection circuitry detects a mismatch, a recovery process can be triggered. For example, the state of the processing circuits can be drained, the processing circuits can be reset, and the correct state is restored to the erroneous processing circuit as well as the other processing circuits. Therefore, by providing at least three redundant processing circuits (rather than only two), errors can not only be detected, but also corrected based on the two error-free processors so that forward progress is made and previous processing results are not lost. However, this generic recovery process is relatively expensive since draining, resetting and restoring the CPUs requires a significant number of clock cycles.

The present technique recognises that this generic recovery process may be excessive for some errors and in some cases a targeted recovery process may be used to resolve errors for a lower cost. For example, signal nodes in the at least three processing circuits may be categorised into groups where a mismatch in relation to corresponding signal nodes of a first group is indicative of an error that requires a full recovery process to be performed, whilst a mismatch in relation to corresponding signal nodes of a second group is indicative of an error that can be corrected by the targeted recovery process. In addition, the targeted recovery process is performed for a subset of components of the erroneous processing circuit, and thus requires fewer clock cycles or less power consumption than the full recovery process.

In some examples, the targeted recovery process uses state information derived from the at least two other processing circuits. This allows the state of the erroneous processing circuit to be corrected on the basis of the common state of the two other processing circuits.

In some examples, a first group of signal nodes may be categorised on the basis that they are external nodes of the at least three processing circuits. When an error is detected on such a signal node there is a chance that the error has propagated throughout the erroneous processing circuit. Therefore, the full recovery process is triggered to resolve errors detected on external nodes.

In some examples, a second group of signal nodes may be categorised on the basis that they are internal nodes of the at least three processing circuits. When an error is detected on these signal nodes the error may not have propagated to at least one component of the erroneous processing circuit, so such a component can be omitted from the targeted recovery process. Therefore, the targeted recovery process can be triggered for resolving errors detected on internal nodes.

In some examples, the subset of components that are subjected to the targeted recovery process are one or more storage structures. Triggering the targeted recovery process for one or more storage structures allows components of the erroneous processing circuit to be selectively corrected in dependence on where the error was detected whilst avoiding expenditure of time and power on correcting components which are yet to store or process the erroneous data.

In some examples, the second group of signal nodes are signal paths connected to the one or more storage structures in the at least three processing circuits. In this way, a mismatch between corresponding signal paths can be detected to determine when an error occurs, and the targeted recovery process for the storage structures connected to the signal path can be triggered, providing a cheap and efficient way of correcting the erroneous data in the storage structure.

For example, the signal paths connected to the storage structures may be write interface signal paths. When a mismatch is detected on corresponding write signal interface paths in the at least three processing circuits, it can be determined that an error has occurred and that the error has not yet propagated to other components of the erroneous processing circuit. That is, when an error is detected on a write interface single path of a storage structure, other operations cannot have simultaneously read the wrong value from that storage structure. Therefore, triggering the targeted recovery process in response to such errors before it propagates throughout the erroneous processing circuit allows a cheaper targeted recovery process to be implemented as less components of the erroneous processing circuit need to be corrected.

In some examples, the mismatch being detected in relation to corresponding signal nodes within the second group is indicative of erroneous data accessible to a processing pipeline of the erroneous processing circuit, and the corresponding signal nodes are located such that at a time when the mismatch is detected, the erroneous data has yet to be accessed by the processing pipeline of the erroneous processing circuit. Since the processing pipeline has yet to access the erroneous data it can be determined that data in the pipeline is still correct and thus any recovery process need not restore the pipeline. Therefore, the targeted recovery process can be triggered for components other than the pipeline and the error can be resolved at a relatively lower cost.

In some examples, the mismatch being detected in relation to corresponding signal nodes within the first group is indicative of a need to restore a processing pipeline of the erroneous processing circuit. This may for example be due to erroneous data having been processed by the pipeline, and hence a full recovery process is appropriate due to the potential effects such processing may have on the apparatus.

In some examples, the full recovery process is performed for at least one component of the processing pipeline, and the subset of components associated with the targeted recovery process comprise components other than those of said processing pipeline. Therefore, the targeted recovery process for the subset of components, or the full recovery process may be performed on the basis of whether or not an error may have propagated to the processing pipeline. The flexibility provided between a targeted recovery process for some errors, and a full recovery process for others, allows more efficient correction of errors since a more expensive full recovery process need not be unnecessarily triggered for the correction of all errors.

In some examples, the apparatus further comprises recovery control circuitry to control the at least three processing circuits to perform the full recovery process in response to the first trigger and to control the at least three processing circuits to perform the targeted recovery process in response to the second trigger. The way in which the recovery control circuitry controls performance of the full recovery process and the targeted recovery process may vary from implementation to implementation.

For example, in response to the second trigger the recovery control circuitry may be arranged to cause each of the at least three processing circuits to execute an interrupt service routine (ISR) in order to perform the targeted recovery process.

In some examples, in response to the second trigger the recovery control circuitry may be arranged to cause each of the at least three processing circuits to perform a memory barrier operation to write contents stored within at least one storage structure to memory. This may be achieved by transmitting a signal to an interrupt pin of the processing circuits, thus interrupting processing of current instructions, and controlling the processing circuits to execute a suitable ISR containing a memory barrier instruction, or to employ an alternative technique to invoke the memory barrier operation.

In other examples, the recovery control circuitry may be arranged to control the at least three processing circuits to perform the targeted recovery process with a hardware mechanism. For example, the at least three processing circuits may be configured to be interrupted by the recovery control circuitry, and in response to halt redundant processing of common program instruction, and execute a specific instruction arranged to control performance of the targeted recovery process. That is, the instruction may be a bespoke, dedicated instruction that when executed, causes the targeted recovery process to be performed.

In some examples, during performance of the targeted recovery process the error detection circuitry may be further configured to ignore a mismatch between a signal node on the erroneous processing circuit and corresponding signal nodes on the other processing circuits. Therefore, any mismatch detected in relation to the erroneous processing circuit due to the error that caused triggering of the targeted recovery process is ignored. Thus erroneous data may be drained from the erroneous processing circuit without causing a further recovery process to be needlessly triggered.

In some examples, during performance of the targeted recovery process, the error detection circuitry is further configured to generate an unresolvable error signal when a mismatch is detected between signals on corresponding signal nodes of processing circuits other than said erroneous processing circuit. A mismatch of this type is associated with an unresolvable error because it can no longer be determined which signal nodes are indicative of the correct data values. As such, state information derived from the other processing circuits can no longer be assumed to be correct and the recovery processes cannot be relied upon to correct the error.

In some examples the one or more storage structures comprises a register file, and the targeted recovery process comprises: interrupting processing of the common program instructions by the at least three processing circuits; causing each of the at least three processing circuits to drain contents of their register file to memory via majority voting circuitry to remove erroneous data; restoring content in the register file of each of the at least three processing circuits from the memory; and resuming processing of the common program instructions. In this way the correct data is written to memory and returned to the register files of each of the at least three processing circuits for further processing.

In some examples, the one or more storage structures comprises a store buffer, and the targeted recovery process comprises: interrupting processing of the common program instructions by the at least three processing circuits; performing a memory barrier operation to cause each of the at least three processing circuits to store the data from their store buffer to memory via majority voting circuitry to remove erroneous data; and resuming processing of the common program instructions. In this way the correct data is written to memory. Furthermore, erroneous data is removed from the store buffer so that mechanisms such as a data forwarding path, which could return data from the store buffer to components of the processing unit should that data be required before it has been written to memory, do not propagate erroneous data to other components of the processing circuit, for example the processing pipeline.

The subset of components subjected to the targeted recovery process is a "proper subset". A "proper subset" is a subset of a full set and does not include all members of the full set. That is, at least one member of the full set is not a member of the proper subset.

Figure 1:
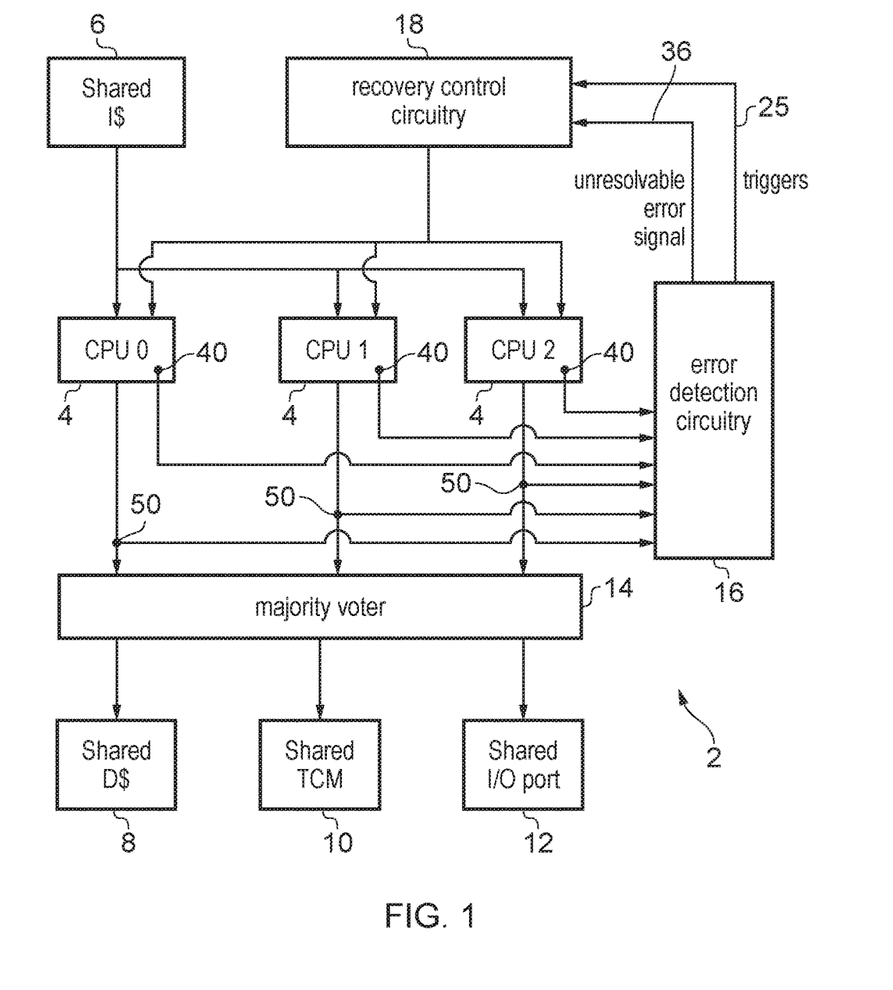
FIG. 1 schematically illustrates an example of an apparatus having three processing circuits for performing redundant processing of a common thread of program instructions and error detection circuitry.

FIG. 1 schematically illustrates an example of a data processing apparatus 2 with triple core lock step protection against errors. The apparatus 2 has three processors 4 for performing redundant processing of a common thread of program instructions. The three processors 4 can be placed in physically separated locations in an integrated circuit, to reduce the chance that an error affecting one processor 4 also affects another processor. The processors 4 share an instruction cache 6 which stores the instructions to be executed by the processors 4, as well as a data cache 8 and tightly coupled memory (TCM) 10 for storing data processed by the processors 4, and an input/output (I/O) port 12 for communicating with peripheral devices. As the shared storage circuits 6, 8, 10 are not triplicated, the data/instructions stored in these units may be protected using error detecting or correcting codes (e.g. parity codes, cyclic redundancy checks, checksums, block codes, etc.), which provide some redundant information to allow for at least detection of errors caused by single event upsets in the storage circuits (and optionally correction of the errors too). The outputs of the processors 4 are passed to majority voter circuitry 14 which selects the value generated by a majority of the processors 4, i.e. at least two of the processors, as the output to be passed to the shared data cache 8, TCM 10 or I/O port 12. Also, the outputs of the processors 4 are passed to error detection circuitry 16 which compares the outputs and detects an error when two or more of the processors 4 generate different results. Recovery control circuitry 18 is provided to control the performance of recovery processes for resolving errors, and is responsive to triggers from the error detection circuitry 16.

The error detection circuitry 16 is coupled to multiple nodes of each of the processors 4. These include internal nodes 40 and external nodes 50. In the apparatus 2 internal nodes are characterised in that they are positioned between components of a processor 4 and external nodes are characterised in that they are positioned on an output path of a processor 4. A mismatch detected on an internal node 40 may be indicative of a different type of error to a mismatch detected on an external error. For example, a mismatch detected on an internal node 40 may be indicative of erroneous data that has not yet been processed by subsequent components of the erroneous processor. On the other hand, a mismatch detected on an external node 50 is indicative of data that has propagated through the erroneous processors. On the basis of whether a mismatch has been detected on internal nodes 40, or external nodes 50, the error detection circuitry 16 may select an appropriate trigger 25 to indicate to the recovery control circuitry 18 which recovery process is to be performed.

During operation of the apparatus 2, at each clock cycle, the instructions to execute are read from the instruction cache 6 or the TCM 10, and distributed to the triplicated processors 4. The processor outputs are majority-voted and forwarded to the data cache 8, TCM 10, and I/O ports 12. Simultaneously, the error detection circuitry 16 checks if there is any mismatch in the outputs delivered by the three processors 4. If there is a mismatch, all processors are interrupted and the error detection logic 16 identifies whether it is a correctable error (where a majority of the processors delivers the same output) or an uncorrectable error (where a majority cannot be determined). In the example of FIG. 1, the error detection circuitry 16 would be able to determine a majority if two or more of the processors 4 output the same value, and unable to determine a majority if all three of the processors 4 output different values. However, in other examples where the apparatus comprises more processors, error detection circuitry may be unable to determine a majority even if some of the processors have matching outputs. For example, in an apparatus having five processors, if two processors output a first value, another two processors output a second value, and the fifth processor outputs a third value, then error detection circuitry would be unable to identify a value output by the majority of the processors, and the error would be considered uncorrectable. On the other hand, if three of the processors output a first value, and the remaining two processors each output values differing from the first value as well as the value output by the other remaining processor, a correct value may still be determined on the basis of the first value as it is output by a majority of the processors. If the error is correctable, the error detection circuitry transmits to the recovery control circuitry 18 the appropriate trigger corresponding to the nodes on which the error was detected. In the highly unlikely case that the error is uncorrectable, the system transitions to a fail-safe operation state. Note here that the majority voter 14 acts as an error propagation boundary, preventing correctable errors from propagating to memories 8, 10 and I/O ports 12. While the majority voter 14 is on the critical path of the system 2, it is made from combinational logic which is relatively fast. The error detection logic 16 is out of this critical path and may be pipelined to increase performance.

When a correctable (resolvable) error is detected, a recovery process can be triggered immediately, or could wait for software to start it in response to the processor interrupt. Delaying the start of the recovery can sometimes be useful to prevent the interruption of critical real-time tasks. Note that when an error is detected in one processor, the system can still work safely with the two remaining processors, which are in a functionally correct state. In fact, the correct architectural state to be restored in the erroneous processor is recovered from these two processors in the recovery process. This is done by issuing an interrupt to the processors 4, which flushes at least some of their components and pushes out some of their architectural state (e.g. register files, program counter and state registers) to a storage device, such as the cache 8 or TCM 10. The processor architectural states are passed through the majority voter circuitry 14, and may be stored in a program stack mapped to the ECC-protected TCM 10, for example. At the end of the interrupt handler which performs the state saving, the processors 4 enter a Wait for Event (WFE) low-power standby mode. When the recovery circuitry 18 observes the WFE signal, it issues a reset to the three processors 4 to scrub away any soft error that might exist in their microarchitecture registers. This reset also wakes up the processors 4 from the standby mode, initiating the restoration of the architectural state that was previously pushed onto the program stack. The last register to be restored is the program counter, thus resuming the normal operation of the processors 4 at the same point in the code where it was suspended to launch the recovery process. The recovery process initiated by the recovery control circuitry 18 is automatic and transparent to the software.

Figure 2:
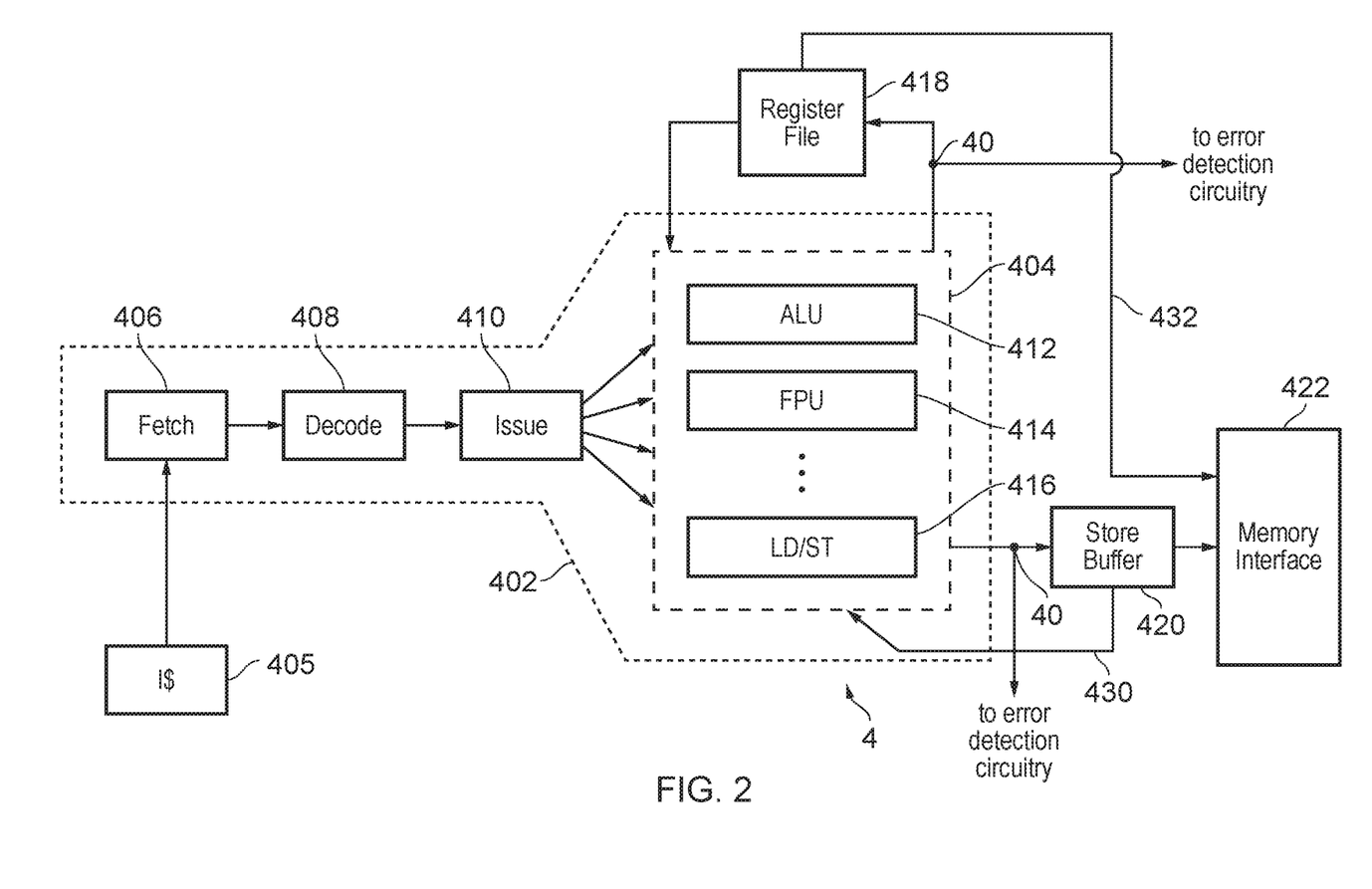
FIG. 2 schematically illustrates an example of one of the processing circuits of an apparatus for performing redundant processing.

FIG. 2 schematically illustrates an example of one of the processors 4 in more detail. The processor 4 comprises a processing pipeline 402 which includes a fetch unit 406, a decode unit 408, an issue unit 410 and a number of execution units 404. The fetch unit 406 fetches instructions from an instruction cache 405. The instructions are decoded by the decoder unit 408 and issued to the appropriate one of the execution units 404 by the issue unit 410. In the example of FIG. 2 the execution units 404 include an arithmetic logic unit (ALU) 412 for performing arithmetic operations, a floating point unit (FPU) 414 for performing floating point operations and a load/store unit (LD/ST) 416 for loading/storing data from the pipeline to a memory. It will be appreciated that these are just some examples of possible execution units, and that other execution units may be included. The processor 4 also includes a register file 418 and a store buffer 420, both of which are storage units that can store data. The register file 418 is coupled to the execution units and may be used to store data which is used by the execution units 404 when executing instructions. The store buffer 420 buffers data that is to be written to memory by the load store unit 416 via the memory interface 422. A forwarding data path 430 is provided between the store buffer 420 and the execution units 404 so that if data has been sent to memory by the load store unit 416, but is required again and is still held in the store buffer 420, it can be retrieved from the store buffer 420 which is quicker than accessing the data cache 8.

The processor also includes a number of internal nodes 40, which may be monitored by the error detection circuitry 16. One of the internal nodes 40 is coupled to the write data port of the register file 418. Another internal node 40 is coupled to the input of the store buffer 420. By monitoring these internal nodes 40 with the error detection circuitry 16 a less expensive recovery process can be performed to correct the errors because less components of the erroneous processor need to be restored.

For example, a mismatch that is detected on corresponding write data ports of each of the register files 418 of the processors 4 is indicative of erroneous data to be written to and stored in one of the register files 418. However, at this stage that erroneous data has not yet been read back into the execution units 404 from the register file 418, so will not yet have had the potential to corrupt the state of the processing pipeline 402. As such, a less expensive recovery process that restores data in the register file 418 of the erroneous processor 4, and does not include any recovery processes for the execution units 404, or the store buffer for example, may be performed. For example, as will described in more detail with reference to FIGS. 6, 7 and 8, erroneous contents of the register file may be drained via data path 432, or via the LD/ST unit 416 and the store buffer 420, to the memory interface 422, where it will be dispatched to memory. Correct data may then be written to the register file 418, at which point processing can continue on the basis of the correct data.

When a mismatch is detected on corresponding inputs to the store buffers 420, a similar process can be performed on the basis of the assumption that erroneous data present in the store buffer 420 of the erroneous processor 4 has not yet propagated to other components of the processor 4, via the data forwarding path 430 for example. Thus the targeted recovery process in this case may also be performed for the store buffer 420 whilst omitting other components such as the execution units 404 or the register file 418 from the recovery process.

Figure 3:
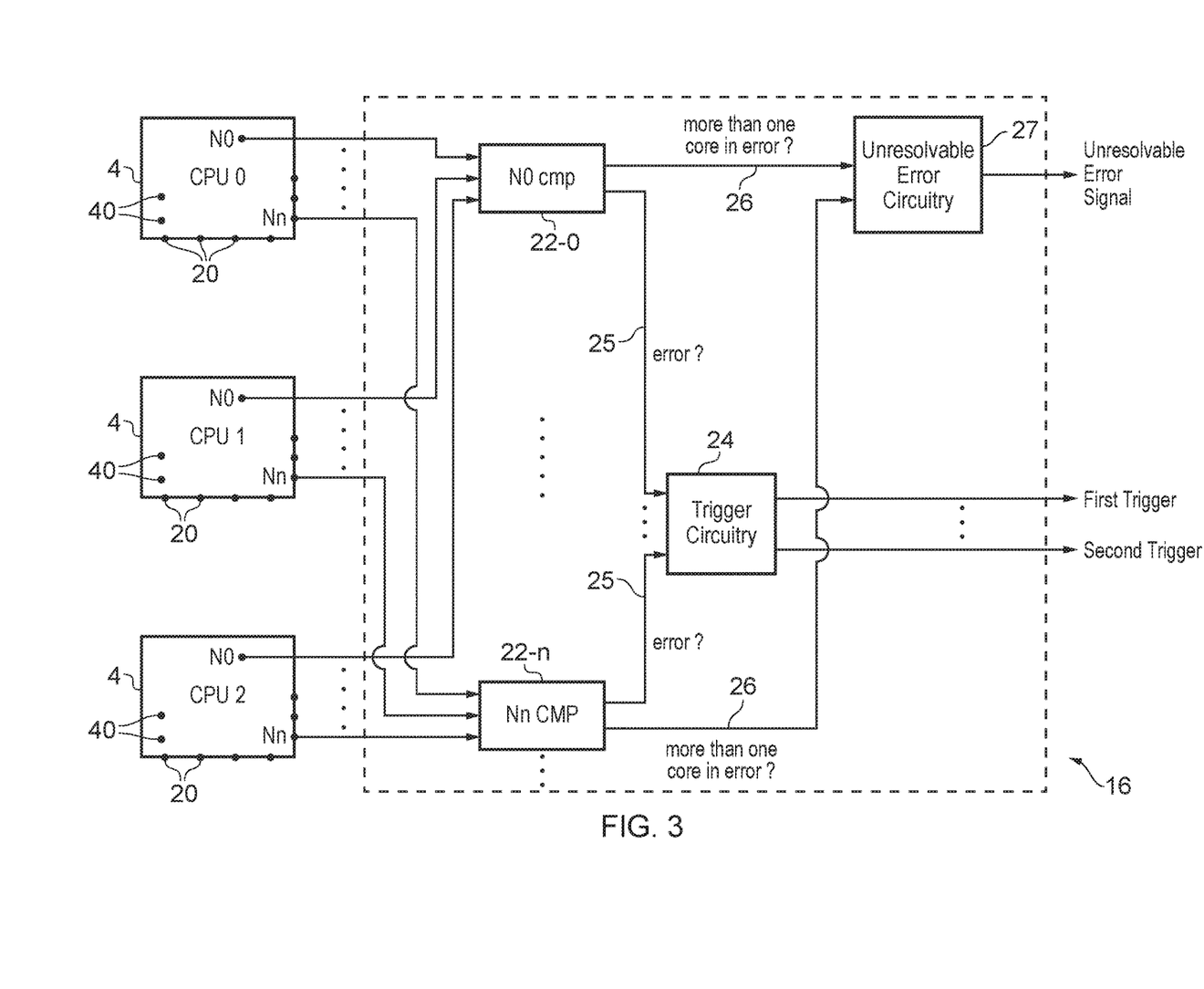
FIG. 3 schematically illustrates an example of error detection circuitry for detecting a mismatch between signals on corresponding nodes of at least three processing circuits.

FIG. 3 schematically illustrates one example of error detection circuitry 16. The error detection circuitry 16 is coupled to n nodes of each processor 4. The n nodes include both internal nodes 40 and external nodes 20. The error detection circuitry 16 includes a number of comparators 22 each corresponding to one of the types of signal nodes. Each comparator 22 receives the signal values from corresponding signal nodes in each of the processors 4. For example comparator 22-0 in the example of FIG. 3 receives the signals from node N0 in each of the processors 4 while comparator 22-*n* receives the signals from node Nn in each of the processors 4. While FIG. 3 shows only two comparators for conciseness, it will be appreciated that similar comparators 22 would be provided for each of the nodes of interest. Each comparator 22 determines whether all of the signals from the corresponding signal nodes are the same, and asserts its output signal 25 if any divergence between the signals on the corresponding signals nodes is detected. Trigger circuitry 24 is coupled to the comparators 22, and in response to a comparator asserting its output signal 25, the trigger circuitry selectively generates a trigger to perform a recovery process.

The triggers may be configured in a number of ways. For example, a first trigger may be associated with all the comparators 22 coupled to external nodes 20 and a second trigger may be associated with all the comparators coupled to internal nodes 40. The error detection circuitry can then assert the first trigger when a full recovery process is required, or assert the second trigger when a targeted recovery process is sufficient. In this case, part of a targeted recovery process would include identifying which of the internal nodes 40 is associated with the error in order to specifically correct components coupled to that node.

Alternatively, or additionally, some of the comparators 22 may be arranged to indicate to the trigger circuitry 24 which of the corresponding nodes they are coupled to. In this way, the trigger circuitry 24 can selectively generate a trigger specifically identifying which of the nodes is associated with the error, and the recovery control circuitry 18 can select an appropriate targeted recovery process accordingly.

Each comparator 22 may also output a second signal 26 indicating whether only one of the processors 4 had a different output to the other processors, or whether more than one processor 4 is in error (when the three processors all have different outputs). Unresolvable error logic 27 receives this second signal 26 and is configured to generate an unresolvable error signal in response.

Figure 4:
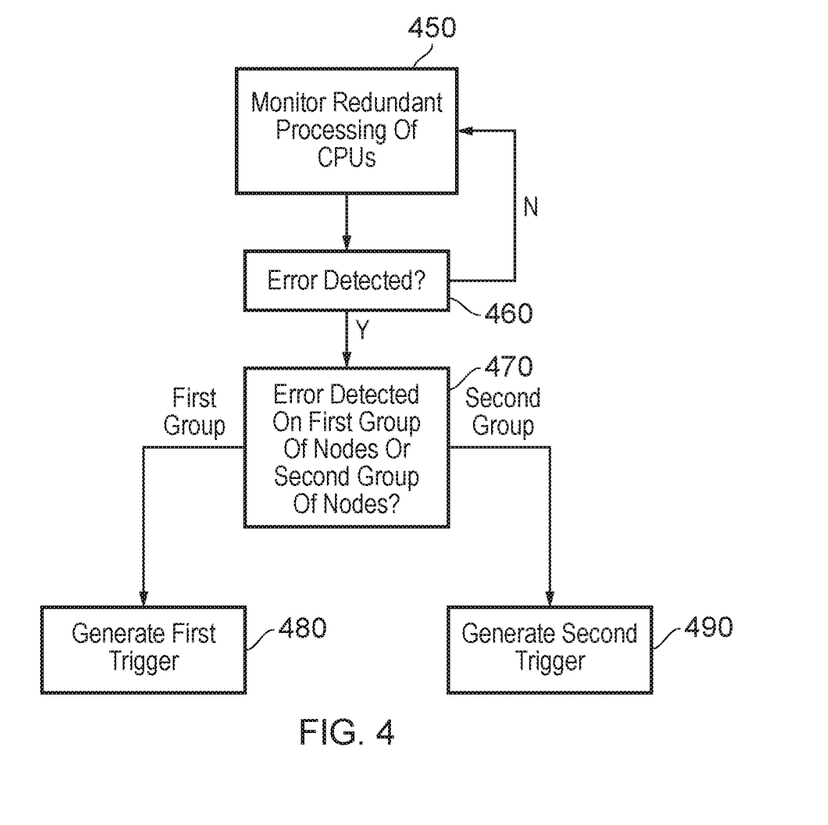
FIG. 4 shows an example of a method for error detection.

FIG. 4 shows a flow diagram illustrating a method for operation of the error detection circuitry 16. At step 450 the redundant processing of CPUs 4 is passively monitored for errors. For example, as described with reference to FIG. 1 and FIG. 3, the error detection circuitry passively monitors corresponding nodes on each of the CPUs 4 and detects an error when a signal on one of the corresponding nodes differs to the same nodes in the other CPUs 4. When an error is detected as shown in step 460, the error detection circuitry 16 proceeds to step 470 where it is determined whether the error was detected on a first group of nodes or a second group of nodes. The first group of nodes may be external to the CPUs 4, for example on the output paths of each CPU 4, whilst the second group of nodes may be internal nodes between components of the CPUs 4. If the error is detected on the first group of nodes, then a first trigger is generated as shown in step 480, and if the error is detected on the second group of nodes, then a second trigger is generated as shown in step 490. By selectively generating different triggers for mismatches between different types of nodes, a number of different recovery processes may be implemented for the different types of error. By tailoring recovery processes to the different types of errors that can arise, correcting errors requires less clock cycles and power consumption compared to a system in which a generic recovery process is used to correct all errors.

Figure 5:
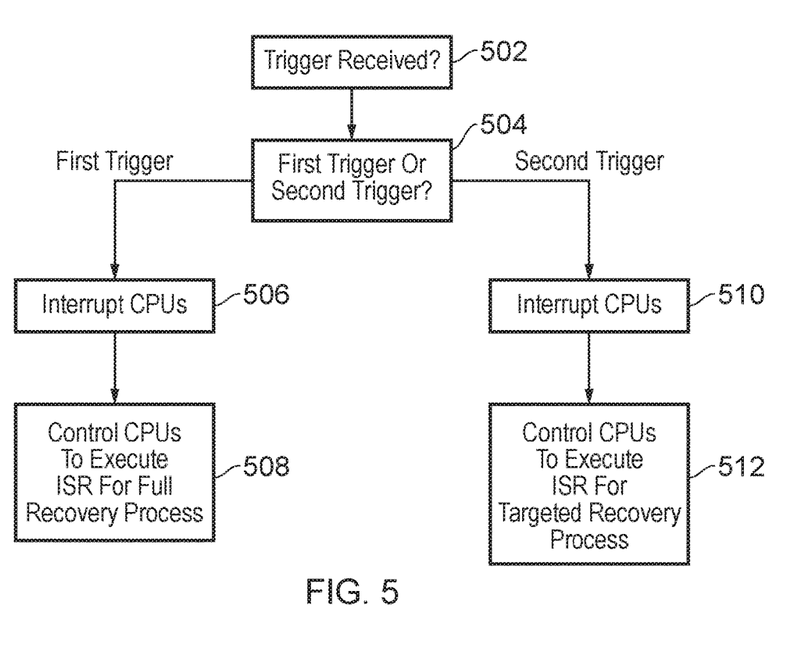
FIG. 5 shows an example of a method for resolving errors in response to error detection.

FIG. 5 shows a flow diagram illustrating a method for operation of the recovery control circuitry 18. At step 502 a trigger is received from the error detection circuitry 16. At step 504, the recovery control circuitry determines whether the trigger is a first trigger or a second trigger. When the trigger is a first trigger, the recovery control circuitry 18 interrupts the CPUs 4 as shown in step 506, and controls the CPUs 4 to execute an interrupt service routine (ISR) for a full recovery process as shown in step 508. On the other hand, if at step 504 it is determined that the trigger is a second trigger, then the recovery control circuitry 18 interrupts the CPUs 4 at step 510 and controls the CPUs 4 to execute an ISR for a targeted recovery process. The ISR for a targeted recovery process in this example is a default targeted recovery process that can be used for any error that is an associated with the second trigger. The ISR itself will include steps for determining which group of corresponding nodes in the CPUs 4 is associated with an error, and tailor the recovery process to components associated with that node accordingly.

The ISRs may be stored in the shared TCM 10, and in response to an interrupt the CPUs may be directed to the memory location that stores the appropriate ISR. For example, an interrupt issued in step 506 can also indicate the address location of the ISR for a full recovery process, whereas an interrupt issued in step 510 can indicate a different address location of the ISR for a targeted recovery process.

Figure 6:
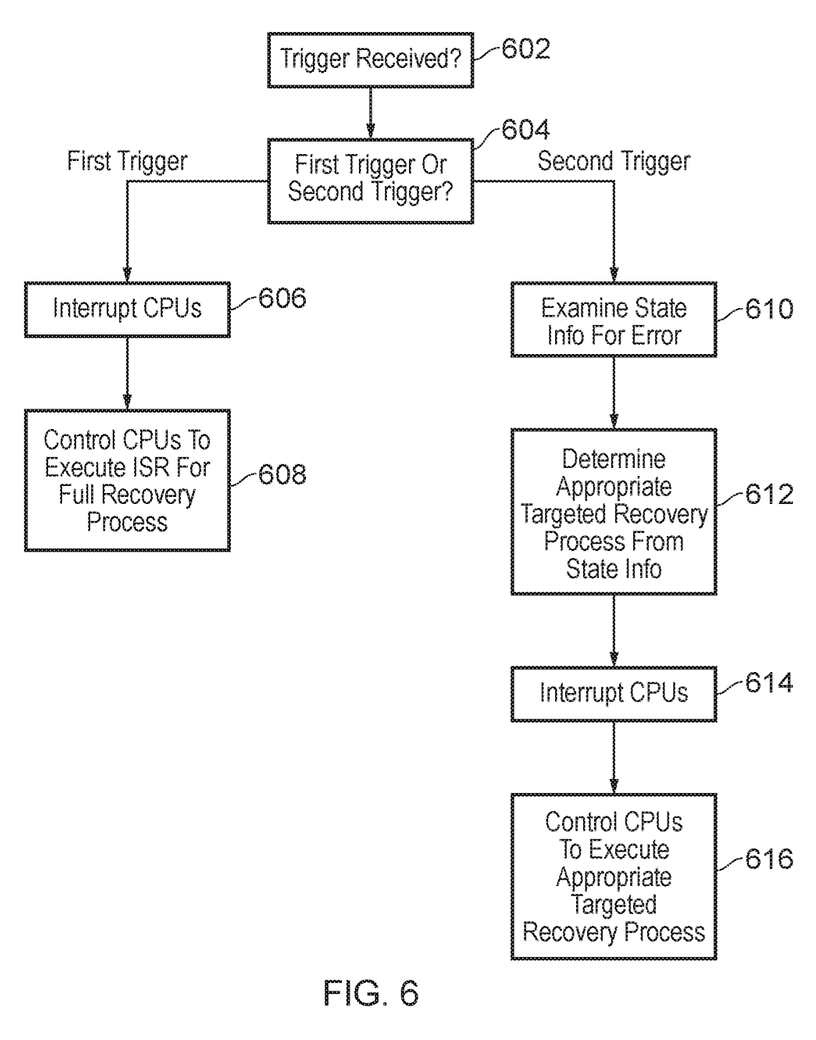
FIG. 6 shows another example of a method for resolving errors in response to error detection.

FIG. 6 shows a flow diagram illustrating another method for operation of the recovery control circuitry 18. The steps for receiving the first trigger and controlling the CPUs 4 to execute an ISR for a full recovery process are the same as those in FIG. 5. However, this method for operation differs in that if it is determined in step 604 that the trigger is a second trigger, then at step 610 the recovery control circuitry examines state information for the error. For example, the trigger may also contain an indicator of the group of corresponding nodes of the CPUs 4 from which the error was detected, as described in relation to FIG. 3. From this indication, the error control circuitry 18 may determine which targeted recovery process is appropriate on the basis of the state info, as shown in step 612. Then in step 614, the CPUs are interrupted, and in step 616, the recovery control circuitry 18 controls the CPUs to execute the appropriate targeted recovery process as determined in step 612.

Therefore, there may be a number of ISRs for targeted recovery processes, each designed for a specific group of corresponding nodes in the CPUs 4 and the associated components. In this case, there are effectively a number of second triggers, as described in relation to FIG. 3, each of which indicates which particular set of corresponding nodes the error was detected at, and thus also indicating which particular ISR is required.

In some other examples, a data processing apparatus 2 may store a generic ISR for the targeted recovery process, as well as a number of ISRs for specific targeted recovery processes.

Figure 7:
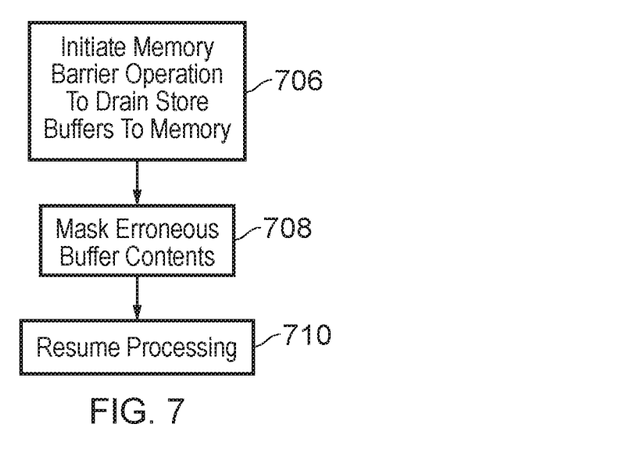
FIG. 7 shows an example of a method for resolving an error in a store buffer.

FIG. 7 shows a method that may be performed by an ISR when an error is detected in association with the store buffer 420, such as that of the apparatus 2 shown in FIG. 2. In step 706 a memory barrier operation is initiated to drain the contents of the store buffers of all of the CPUs to the data cache 8 or to main memory via I/O port 12. In step 708, the erroneous store buffer's contents is masked by the operation of the majority voter 14, and hence the content that is common between the other processing circuits is written to the data cache 8 or routed to main memory via the I/O port 12. With all the store buffers 420 emptied, and more specifically, with the erroneous data having been drained from the erroneous CPU such that it can no longer be accessed, via a data forwarding path 430 for example, processing may be resumed in step 710.

Figure 8:
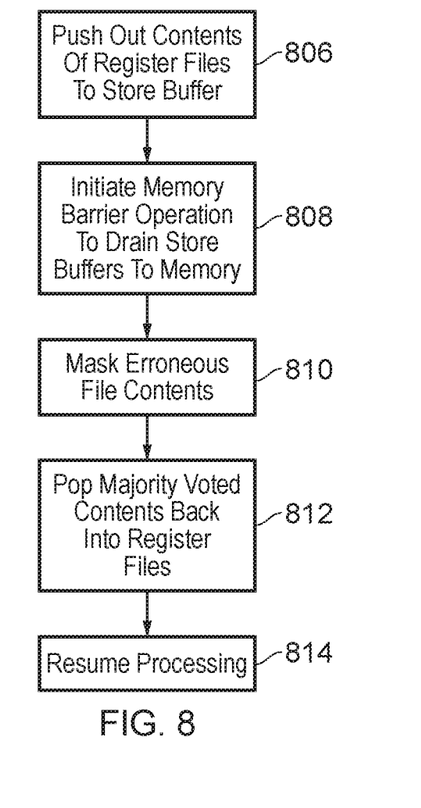
FIG. 8 shows an example of a method for resolving an error in a register file.

FIG. 8 shows a method that may be performed by an ISR when an error is detected in association with the register file 418. In step 806, the contents of the register files are pushed out to the store buffer 420. At step 808 a memory barrier operation to drain the content of the store buffers 420 to the data cache 8 or to main memory via the I/O port 12. As an alternative to steps 806 and 808, the method may include an operation in which content of the register file 418 is drained to main memory directly, for example via data path 432 and the memory interface 422 as shown in FIG. 2. At step 810, the contents of the erroneous register file, i.e. the erroneous data, is masked, and the data that is common between the other processing circuits as determined by the majority voter 14 is written to the data cache 8 or to main memory via the I/O port 12. In addition, at step 812 the majority voted contents from step 810 is written back to the register files 418, such that all the register files 418 of the CPUs 4 store common, and correct data. At step 814, processing is resumed.

Note that in an alternative embodiment the software-based ISR mechanisms described in FIG. 7 and FIG. 8 may alternatively be replaced by a suitable hardware mechanism. For example, each of the processing circuits 4 may be configured to receive a pulse from the recovery control circuitry 18 via a dedicated pin, and in response to the pulse execute a specific instruction that causes the targeted recovery process to be performed. Furthermore, the processing circuits may include multiple dedicated pins, each pin causing execution of a different instruction, each instruction corresponding to the different targeted recovery processes as described above (e.g. targeted recovery process for an error in register file or targeted recovery process for an error in the store buffer).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
at least three processing circuits to perform redundant processing of common program instructions; and
error detection circuitry coupled to a plurality of signal nodes of each of said at least three processing circuits, said error detection circuitry comprising comparison circuitry to detect a mismatch between signals on corresponding signal nodes in said at least three processing circuits;
said plurality of signal nodes forming a first group of signal nodes and a second group of signal nodes; wherein
in response to said mismatch being detected in relation to corresponding signal nodes within said first group said error detection circuitry is configured to generate a first trigger for a full recovery process for resolving an error detected for an erroneous processing circuit using state information derived from at least two other processing circuits, and in response to said mismatch being detected in relation to corresponding signal nodes within said second group to generate a second trigger for a targeted recovery process for a subset of components of said erroneous processing circuit.

2. The apparatus according to claim 1, wherein said targeted recovery process uses state information derived from said at least two other processing circuits.

3. The apparatus according to claim 1, wherein said first group of signal nodes are external nodes of said at least three processing circuits.

4. The apparatus according to claim 1, wherein said second group of signal nodes are internal nodes of said at least three processing circuits.

5. The apparatus according to claim 1, wherein said subset of components are one or more storage structures.

6. The apparatus according to claim 5, wherein said second group of signal nodes are signal paths connected to said one or more storage structures in each of said at least three processing circuits.

7. The apparatus according to claim 6, wherein said signal paths connected to said storage structures are write interface signal paths.

8. The apparatus according to claim 1, wherein performance of the targeted recovery process requires less processing resources than performance of the full recovery process.

9. The apparatus according to claim 1, wherein said mismatch being detected in relation to corresponding signal nodes within said second group is indicative of erroneous data accessible to a processing pipeline of said erroneous processing circuit, and the corresponding signal nodes are located such that at a time when said mismatch is detected, said erroneous data has yet to be accessed by the processing pipeline of said erroneous processing circuit.

10. The apparatus according to claim 1, wherein said mismatch being detected in relation to corresponding signal nodes within said first group is indicative of a need to restore a processing pipeline of said erroneous processing circuit.

11. The apparatus according to claim 1, wherein said full recovery is performed for at least one component of a processing pipeline, and said subset of components comprises components other than those of said processing pipeline.

12. The apparatus according to claim 1, further comprising recovery control circuitry to control said at least three processing circuits to perform said full recovery process in response to said first trigger and to control said at least three processing circuits to perform said targeted recovery process in response to said second trigger.

13. The apparatus according to claim 12, wherein in response to said second trigger said recovery control circuitry is arranged to cause each of said at least three processing circuits to execute an interrupt service routine in order to perform said targeted recovery process.

14. The apparatus according to claim 12, wherein in response to said second trigger said recovery control circuitry is arranged to cause each of said at least three processing circuits to perform a memory barrier operation to write contents stored within at least one storage structure to memory.

15. The apparatus according to claim 1, wherein during performance of said targeted recovery process, said error detection circuitry is further configured to ignore a mismatch between a signal node on said erroneous processing circuit and corresponding signal nodes on the other processing circuits.

16. The apparatus according to claim 15, wherein during performance of said targeted recovery process, said error detection circuitry is further configured to generate an unresolvable error signal when a mismatch is detected between signals on corresponding signal nodes of processing circuits other than said erroneous processing circuit.

17. The apparatus according to claim 7, wherein said one or more storage structures comprises a register file, and said targeted recovery process comprises:
   interrupting processing of the common program instructions by said at least three processing circuits;
   causing each of the at least three processing circuits to drain contents of their register file to memory via majority voting circuitry to remove erroneous data;
   restoring content in the register file of each of said at least three processing circuits from the memory; and
   resuming processing of the common program instructions.

18. The apparatus according to claim 7, wherein said one or more storage structures comprises a store buffer, and said targeted recovery process comprises:
   interrupting processing of the common program instructions by said at least three processing circuits;
   performing a memory barrier operation to cause each of the at least three processing circuits to store the data from their store buffer to memory via majority voting circuitry to remove erroneous data; and
   resuming processing of the common program instructions.

19. An apparatus comprising:
   at least three means for processing for performing redundant processing of common program instructions; and
   means for detecting errors coupled to a plurality of signal nodes of each of said at least three processing means, said means for detecting errors comprising comparing means for detecting a mismatch between signals on corresponding signal nodes in said at least three means for processing;
   said plurality of signal nodes forming a first group of signal nodes and a second group of signal nodes; wherein
   in response to said mismatch being detected in relation to corresponding signal nodes within said first group said means for detecting errors is configured to generate a first trigger for a full recovery process for resolving an error detected for an erroneous means for processing using state information derived from at least two other means for processing, and in response to said mismatch being detected in relation to corresponding signal nodes within said second group to generate a second trigger for a targeted recovery process for a subset of components of said erroneous means for processing.

20. A method comprising:
   performing redundant processing of common program instructions using at least three processing circuits;
   detecting a mismatch between signals on corresponding signal nodes in said at least three processing circuits;
   said signal nodes forming a first group of signal nodes and a second group of signal nodes; and
   in response to detecting said mismatch in relation to corresponding signal nodes within said first group, generating a first trigger for a full recovery process for resolving an error detected for an erroneous processing circuit using state information derived from at least two other processing circuits, and in response to said mismatch being detected in relation to corresponding signal nodes within said second group, generating a second trigger for a targeted recovery process for a subset of components of said erroneous processing circuit.

* * * * *